United States Patent
Wang et al.

(10) Patent No.: US 6,611,378 B1
(45) Date of Patent: Aug. 26, 2003

(54) THIN-FILM INTERFERENCE FILTER WITH QUARTER-WAVELENGTH UNIT SUB-LAYERS ARRANGED IN A GENERALIZED PATTERN

(75) Inventors: Ligang Wang, Rochester, NY (US); Turan Erdogan, Spencerport, NY (US)

(73) Assignee: Semrock, Inc., Rochester, NY (US)

( * ) Notice: Subject to any disclaimer, the term of this patent is extended or adjusted under 35 U.S.C. 154(b) by 32 days.

(21) Appl. No.: 10/028,031

(22) Filed: Dec. 20, 2001

(51) Int. Cl.[7] .............................. G02B 1/10; G02B 5/28; B05D 5/06
(52) U.S. Cl. ................. 359/588; 359/589; 359/590; 359/900; 427/10
(58) Field of Search ......................... 359/359, 588, 359/589, 590, 900; 427/10

(56) References Cited

U.S. PATENT DOCUMENTS

| | | | |
|---|---|---|---|
| 3,551,017 A | | 12/1970 | Iwasaki et al. |
| 3,697,153 A | | 10/1972 | Zycha |
| 3,759,604 A | * | 9/1973 | Thelen ........................ 359/588 |
| 3,914,023 A | | 10/1975 | Thelen |
| 4,009,453 A | | 2/1977 | Mahlein ..................... 331/94.5 |
| 4,229,066 A | * | 10/1980 | Rancourt et al. ........... 359/359 |
| 4,531,838 A | | 7/1985 | Sawamura .................. 356/382 |
| 4,582,431 A | | 4/1986 | Cole .......................... 356/426 |

(List continued on next page.)

OTHER PUBLICATIONS

"Coating design using very thin high– and low–index layers", W.H. Southwell, Applied Optics, vol. 14, No. 4, Feb. 15, 1985, pp. 457–460.

"The Design of Optical Filers", L.I. Epstein, Journal of the Optical Society of American, vol. 42, No. 11, Nov. 1952, pp. 806–810.

"Completely Automatic Synthesis of Optical Thin Film Systems", J.A, Dobrowolski, P. H. Berning, Applied Optics, vol. 4, No. 8, Aug. 1995, pp. 937–946.

"Use of Equivalent Films in the Design of Infrared Multilayer Antireflection Coatings", Journal of the Optical Society of America, vol. 52, No. 4, Apr. 1962, pp. 431–436.

"Thin Films II, Contributed Papers", A. J. Thelen, 1982 Annual Meeting Optical Society of America, Tuesday, Oct. 19, 1982, pp. 1732.

"Gradient–index antireflection coatings", W.H. Southwell, Optics Letters, vol. 8, No. 11, Nov. 1983, pp. 584–586.

"Optical Behaviour Of Gradient–Index Multilayer Films", V.N. Yadava, S.K. Sharma, and K.L. Chopra, Thin Solid Films 21, 1974, pp. 297–312.

"Flip–flop thin–film design program with enhanced capabilities", J.A, Dobrowolski and R.A. Kemp, Applied Optics, vol. 31, No. 19, Jul. 1, 1992, pp. 3807–3812.

"Turning point monitoring of narrow–band all–dielectric thin–film optical fiters", H.A. Macleod, Optical Acta., vol. 19, No. 1, 1972, pp. 1–28.

*Primary Examiner*—John Juba
(74) *Attorney, Agent, or Firm*—Eugene Stephens & Associates; Thomas B. Ryan

(57) ABSTRACT

Thin-film interference filters are constructed with a generalized pattern of layers differing in both thickness and refractive index to produce spectral responses appropriate for adjusting optical power among a plurality of different wavelength channels. Each of the layers is composed of unit sub-layers having thicknesses equal to a quarter-wavelength thickness of a monitoring beam. Interference fluctuations of the monitoring beam associated with the deposition of the unit sub-layers enable a gain-flattening filter to achieve greater manufacturing accuracy by exploiting self-correcting effects of "turning point monitoring" techniques.

46 Claims, 5 Drawing Sheets

U.S. PATENT DOCUMENTS

| | | |
|---|---|---|
| 4,663,557 A * | 5/1987 | Martin et al. ............... 313/112 |
| 4,666,250 A | 5/1987 | Southwell |
| 4,747,666 A | 5/1988 | Ishida |
| 4,778,251 A | 10/1988 | Hall et al. |
| 4,793,669 A | 12/1988 | Perilloux |
| 4,832,448 A | 5/1989 | Jones |
| 4,909,631 A | 3/1990 | Tan et al. .................... 356/382 |
| 5,035,485 A | 7/1991 | Kageyama |
| 5,138,222 A | 8/1992 | Toide et al. ................. 313/474 |
| 5,179,468 A | 1/1993 | Gasloli ....................... 359/359 |
| 5,181,143 A | 1/1993 | Southwell ................... 359/586 |
| 5,233,464 A | 8/1993 | Costich ....................... 359/359 |
| 5,241,417 A | 8/1993 | Sekiguchi ................... 359/586 |
| 5,245,474 A | 9/1993 | Chabassier et al. ......... 359/578 |
| 5,274,661 A | 12/1993 | Von Gunten et al. ......... 372/99 |
| 5,355,217 A | 10/1994 | Canteloup et al. .......... 356/357 |
| 5,410,431 A | 4/1995 | Southwell ................... 359/580 |
| 5,425,964 A * | 6/1995 | Southwell et al. ............. 427/10 |
| 5,426,532 A | 6/1995 | Costich ....................... 359/586 |
| 5,625,492 A | 4/1997 | Gunkel et al. ............... 359/586 |
| 5,719,989 A | 2/1998 | Cushing ...................... 359/589 |
| 5,889,592 A | 3/1999 | Zawaideh .................... 356/357 |
| 5,923,429 A | 7/1999 | Takeuchi et al. ............ 356/382 |
| 5,926,317 A | 7/1999 | Cushing ...................... 359/588 |
| 5,999,267 A | 12/1999 | Zawaideh .................... 356/381 |
| 5,999,322 A | 12/1999 | Cushing ...................... 359/589 |
| 6,011,652 A | 1/2000 | Cushing ...................... 359/588 |
| 6,034,772 A | 3/2000 | Marcus et al. ............... 356/357 |
| 6,046,854 A | 4/2000 | Bhagavatula ............... 359/577 |
| 6,115,180 A | 9/2000 | Hirai et al. .................. 359/586 |
| 6,117,530 A | 9/2000 | Jonza et al. ................. 428/212 |
| 6,137,575 A | 10/2000 | Sugiyama et al. ........... 356/357 |
| 6,157,490 A | 12/2000 | Wheatley et al. ........... 359/589 |
| 6,208,466 B1 | 3/2001 | Liu et al. ..................... 359/584 |
| 6,432,471 B1 * | 8/2002 | Cook ........................... 427/10 |
| 6,481,369 B1 * | 11/2002 | Takahashi et al. .... 118/723 EB |
| 2002/0131176 A1 * | 9/2002 | Pelekhaty ................... 359/589 |

* cited by examiner

THIN-FILM INTERFERENCE FILTER WITH QUARTER-WAVELENGTH UNIT SUB-LAYERS ARRANGED IN A GENERALIZED PATTERN

TECHNICAL FIELD

Optical filters used for purposes of gain flattening produce complex spectral responses that adjust relative optical power among a plurality of different wavelength channels. Interference filters formed from thin layers of optical materials differing in refractive index, which have been previously used for providing much simpler spectral responses, are subject to additional design considerations that expand spectral response capabilities while employing precise manufacturing controls.

BACKGROUND

Thin-film interference filters having relatively simple band-pass or band-reject spectral responses can be constructed by depositing alternating layers of two different dielectric materials on a transparent substrate. The dielectric materials differ in refractive index. One of the dielectric materials is distinguished as a high index material, and the other dielectric material is distinguished as a low index material.

A manufacturing technique referred to as "turning point monitoring" requires each of the alternating layers to have a physical thickness equal to an integer multiple of a one-quarter-wavelength travel of a narrow-band monitoring light beam as transmitted through the layers. The alternating layers have the same or an integer multiple of the same optical thickness but have physical thicknesses that differ because of differing refractive indices. The quarter-wavelength travel of the monitoring beam (i.e., the physical thickness) is calculated as one-quarter of the wavelength of the monitoring beam in a vacuum divided by the refractive index of the layer material in which the beam is transmitted. The wavelength of the monitoring light beam is generally close to the central wavelength of the interference filter.

As each layer is vacuum deposited, multiple reflections of the monitoring light beam propagating through the deposited layers produce interference effects that vary between points of maximum and minimum interference (i.e., local transmission extrema) at quarter-wavelength thicknesses of the layers. Deposition is switched at turning points from one of the high or low index materials to the other as the appropriate transmission extrema are reached.

The "turning point monitoring" technique has an inherent self-correcting effect that reduces cumulative errors as well as the collective effects of purely random errors. Larger individual layer thickness errors can be accommodated than those of conventional thickness measuring techniques, such as from timed deposits, because each transmission extremum is based in part on the optical performance of all of the preceding layers in addition to the layer whose thickness is being monitored. The benefits of "turning point monitoring" as a self-correcting manufacturing technique are discussed in and article entitled "Turning point monitoring of narrow-band all-dielectric thin-film optical filters", by H. A. Macleod in Optica Acta, Volume 19, Number 1, 1972.

More precise band filter responses, such as for reducing pass-band or side-band ripple, have been attempted with thin-film interference filters by assembling combinations of layers having varying optical thicknesses. For example, U.S. Pat. No. 6,157,490 to Wheatley et al. discloses a multi-layer film in which one of a pair of alternating material layers progressively varies in thickness to sharpen band-edges on one or both sides of reflection bands. Although such thickness variations can be demonstrated mathematically to produce sharper spectral responses, achieving the desired thickness variations in practice remains problematic as the inherent self-correcting effects of "turning point monitoring" are lost.

Generalized patterns of ultra-thin films have been used to produce antireflective coatings exhibiting gradient index profiles. For example, U.S. Pat. No. 4,666,250 to Southwell discloses a generalized arrangement of ultra-thin layers in which a combination of layers having equal physical or optical thickness but differing between two refractive indices are arranged in different orders by trial and error to approximate a predetermined gradient index profile. The ultra-thin layers in the range of ten nanometers or less (which is much shorter than the near micrometer range wavelengths of intended use) are thin enough to exhibit in combination progressively varying refractive indices with low dispersion over an intended spectral range.

Southwell's trial-and-error approach to reaching a desired spectral response starts with a particular arrangement of high and low index layers, reverses one layer at a time (i.e., changes a layer from low to high index or from high to low index), and evaluates the result using a merit function. If the changed response more closely matches the desired response, the change is maintained. Otherwise, the change is reversed. The remaining layers are similarly tested in a prescribed sequence. Good results of this approach can also be demonstrated mathematically, but the ultra-thin layers are too thin for conventional monitoring beams.

Although the "turning point monitoring" technique provides significant advantages for accurately monitoring the thicknesses of vacuum deposited layers, the layer thicknesses to which the technique can be used are limited to multiples of quarter-wavelength travels of monitoring light beams. Filter designs, such as those proposed for sharper band responses requiring progressive variations in layer thickness, and filter designs, such as those proposed for anti-reflective coatings requiring ultra-thin layers, both depart from quarter-wavelength optical thicknesses and fail to benefit from the "turning point monitoring" technique.

More complex filter responses, such as required for gain-flattening filters, have been even more out of reach of the benefits of "turning point monitoring" techniques. Gain-flattening thin-film filter designs have required nearly arbitrary variations in the thicknesses of the deposited layers throughout the thin-film filter structures to equalize the gain spectrum of optical amplifiers. Although mathematically feasible, such gain-flattening designs are not amenable to manufacture. Random errors in layer thicknesses of even thousandths of a percent can lead to significant equalization errors.

SUMMARY OF THE INVENTION

Our invention extends the benefits of "turning point monitoring" techniques to the manufacture of gain-flattening thin-film interference filters for fiber optic communication systems. Thin-film unit sub-layers having physical thicknesses equal to a quarter wavelength travel of a monitoring beam are arranged in a generalized pattern for producing a complex spectral response capable of adjusting power among a plurality of different wavelength channels. The complex spectral responses are achieved to required accuracy by exploiting the self-correcting effects of "turning point monitoring" throughout the deposition of the more generalized pattern of quarter-wavelength thickness unit sub-layers.

One example of our invention is a gain-flattening interference filter having a plurality of layers separately formed from one of at least two different refractive index materials. Each of the layers is composed of an integer multiple number of unit sub-layers having a common refractive index and a common physical thickness corresponding to a quarter-wavelength travel of a monitoring light beam as transmitted through the unit sub-layers. The different refractive index materials include high and low refractive index materials arranged in the unit sub-layers that differ in physical thicknesses in inverse ratio to their refractive indices. The high and low index unit sub-layers are arranged in a substantially non-repeating pattern for producing different attenuating effects among different wavelength channels conveyed through the filter.

The monitoring light beam, which determines the quarter-wavelength travel through the sub-layers, has a wavelength that can differ from a central wavelength of the different wavelength channels attenuated by the filter. Ordinarily, the wavelength of the monitoring light beam is expected to be beyond a working range of wavelengths spanned by the different wavelength channels attenuated by the filter. Monitoring beam wavelengths longer than the working range of the different wavelength channels have been found to produce some of the better designs.

Our gain-flattening interference filter can be made by vacuum depositing layers of thin films exhibiting different refractive indices. Each of the layers is composed of one or more unit sub-layers having physical thicknesses equal to a quarter wavelength travel of a monitoring light beam. The unit sub-layers are arranged in a generalized non-repeating pattern. Filter performance is optimized by exploiting design freedoms that include variations in the monitoring beam wavelength, the refractive indices of the different index materials, and the number and order of the unit sub-layers.

The exemplary filter design begins with a determination of the optical power adjustments required for a plurality of different wavelength channels. At least two different refractive index materials capable of being separately deposited as high and low refractive index layers are chosen along with a wavelength for the monitoring light beam. The high and low refractive index layers are deposited as integer multiples of unit sub-layers having physical thicknesses corresponding to quarter-wavelength travels of the monitoring light beam. The unit sub-layers of the high and low refractive index layers are arranged in a substantially non-repeating pattern for producing different attenuating effects among the different wavelength channels conveyed through the filter.

During the deposition process, the monitoring beam is transmitted through the high and low index layers, and transmissions of the monitoring beam are measured to identify transitions associated with deposition thicknesses corresponding to integer multiples of the quarter-wavelength travels of the monitoring beam. The wavelength for the monitoring beam is preferably chosen from beyond a working range of wavelengths spanned by the different wavelength channels attenuated by the filter.

Combinations of the high and low index unit sub-layers can be organized into a set of base permutations including alternatives that vary in both number and order of the high and low index unit sub-layers. Each of a determined number of levels is filled by one of the base permutations. Collective optical performance characteristics of the levels are evaluated and compared to desired relative optical power adjustments among the plurality of different wavelength channels. The levels are refilled from the set of base permutations based on the results of the comparison for better matching the collective optical performance characteristics of the levels with the desired optical power adjustments among the plurality of different wavelength channels.

The refilling and collective re-evaluation of the levels are repeated in an iterative manner to converge the collective optical performance characteristics of the filled levels toward the desired optical power adjustments among the plurality of different wavelength channels. The performance characteristics of the base permutations can be pre-evaluated for simplifying the re-evaluation of the collective optical performance characteristics of the multiple levels.

Selected filter designs corresponding to particular iterations of the filled levels can be saved based on criteria for matching the determined optical power adjustments among the plurality of different wavelength channels. Additional criteria can be used for choosing among the saved filter designs. For example, the additional criteria can include preferences for fewer total number of the high and low index layers, for monitoring wavelengths maximizing signal-to-noise ratio, and for ease of manufacture. Designs containing insensitive layers that exhibit only weak transmission extrema at quarter-wavelength thicknesses can be excluded.

DRAWING FIGURES

Figure 5:
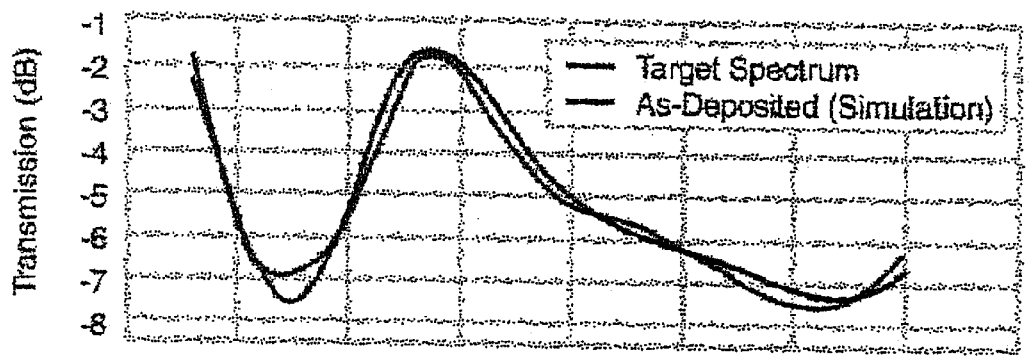
FIG. 5 is a pair of plots contrasting a simulated spectral response of our filter Example A with a target spectral response.
Figure 6:
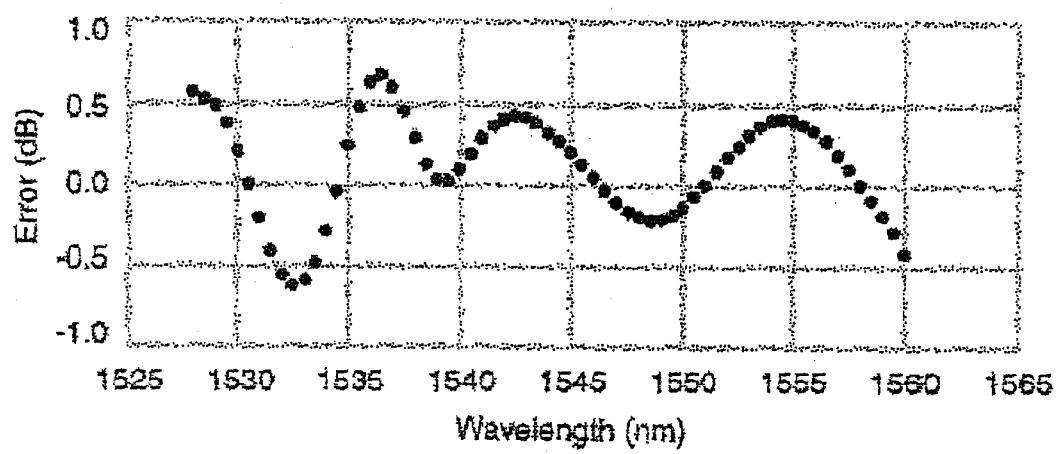

FIG. 6 plots the contrast of FIG. 5.

Figure 7:
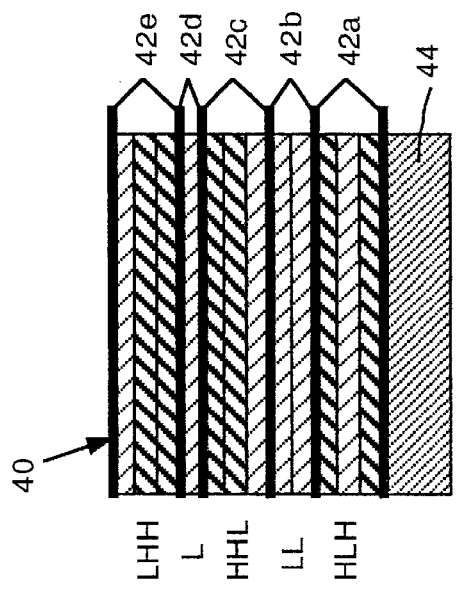

FIG. 7 is a schematic cross-sectional view of another version of our gain-flattening interference filter assembled by levels.

Figure 8:
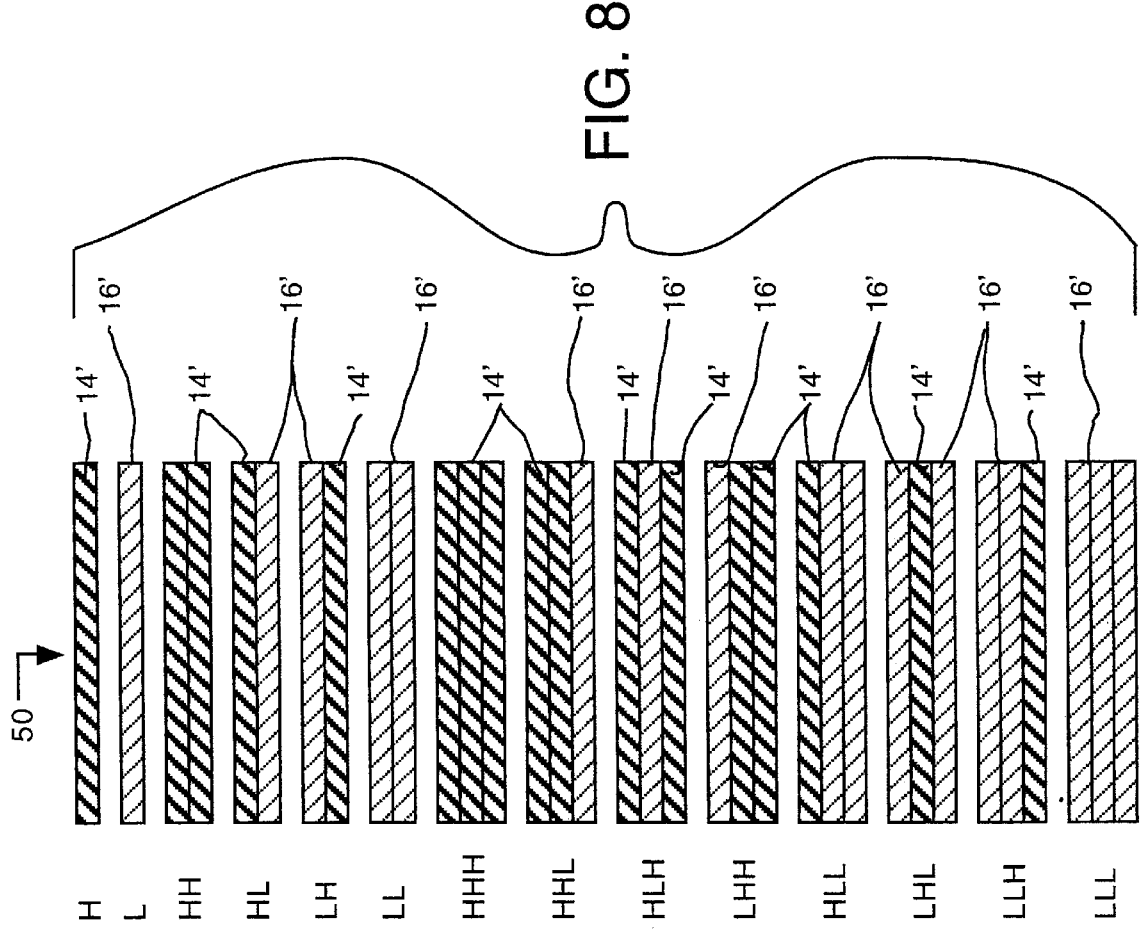

FIG. 8 is a cross-sectional view of high and low index sub-layers organized into a set of base permutations from which each of the levels of the alternative filter can be filled.

Figure 9:
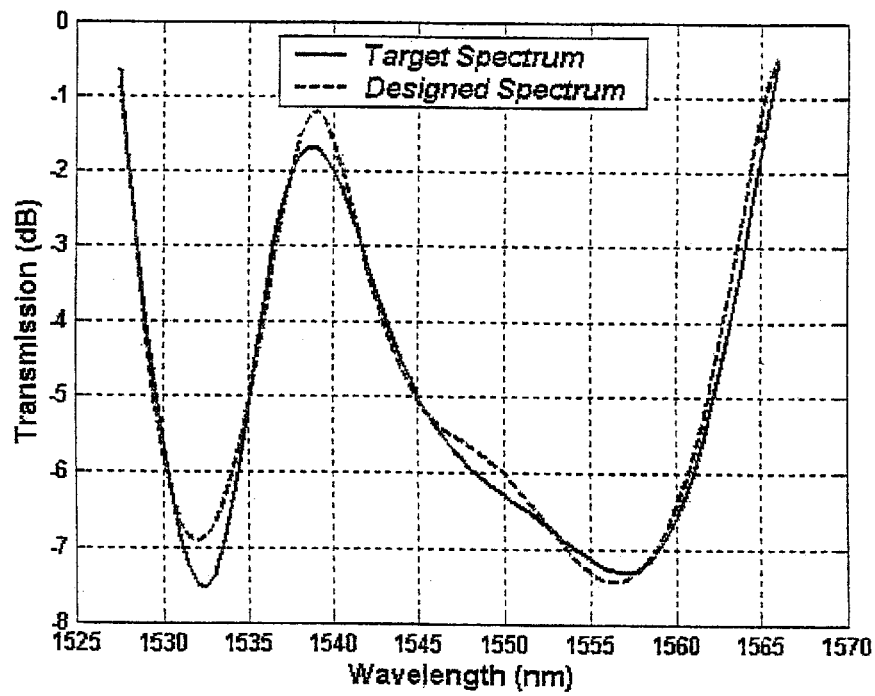

FIG. 9 is a pair of plots contrasting a simulated spectral response of our filter Example B with a target spectral response.

Figure 10:
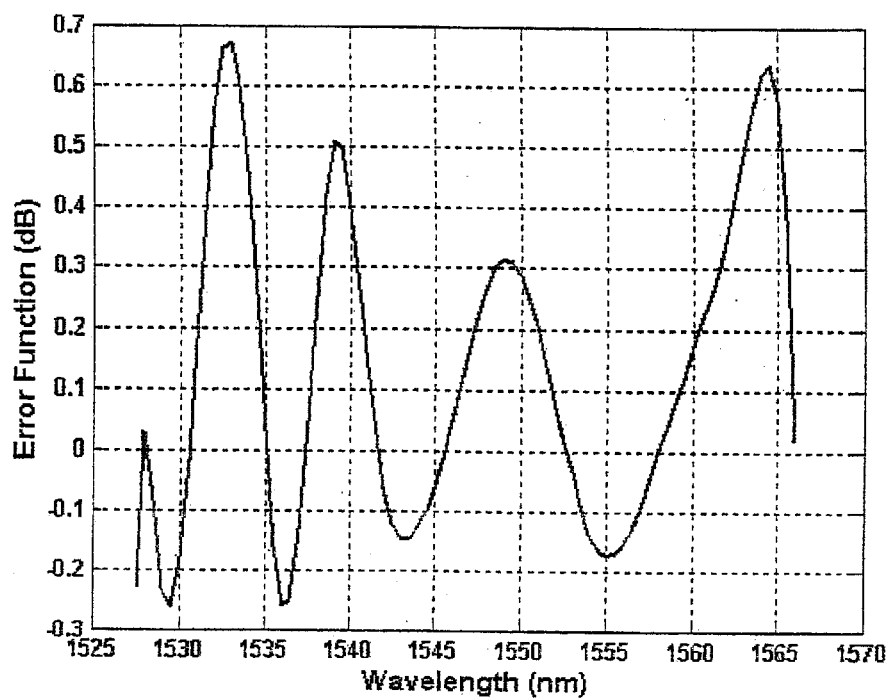

FIG. 10 plots the contrast of FIG. 9.

DETAILED DESCRIPTION

Figure 1:
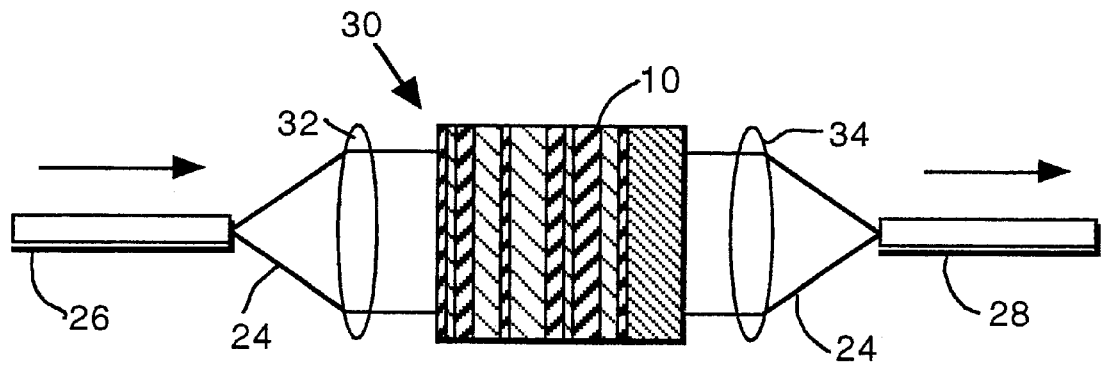
FIG. 1 is a schematic diagram showing one version of our gain-flattening interference filter in cross section within a coupling arrangement of a fiber optic system.

An exemplary gain-flattening thin-film interference filter 10 arranged in accordance with our invention is depicted in FIG. 1. The interference filter 10 is mounted within an optical coupler 30 between input and output fiber sections 26 and 28 of a fiber optic communications system. A light beam 24 conveying a plurality of different wavelength channels diverges from the input fiber section 26 and is collimated by a lens 32 for passing through the interference filter 10 as substantially parallel light. Another lens 34 collects the parallel light emerging from the interference filter 10 and converges the light through a focus on the output fiber section 28. The interference filter 10 can be mounted in a variety of other optical coupling arrangements common to the art for conveying a plurality of different wavelength channels through the filter 10.

In a typical gain-flattening application, the interference filter 10 is placed after or between stages of an amplifier (not shown) such as an erbium-doped fiber amplifier. The highest gain wavelength channels are attenuated most so that all of the channels experience approximately the same net gain.

Figure 2:
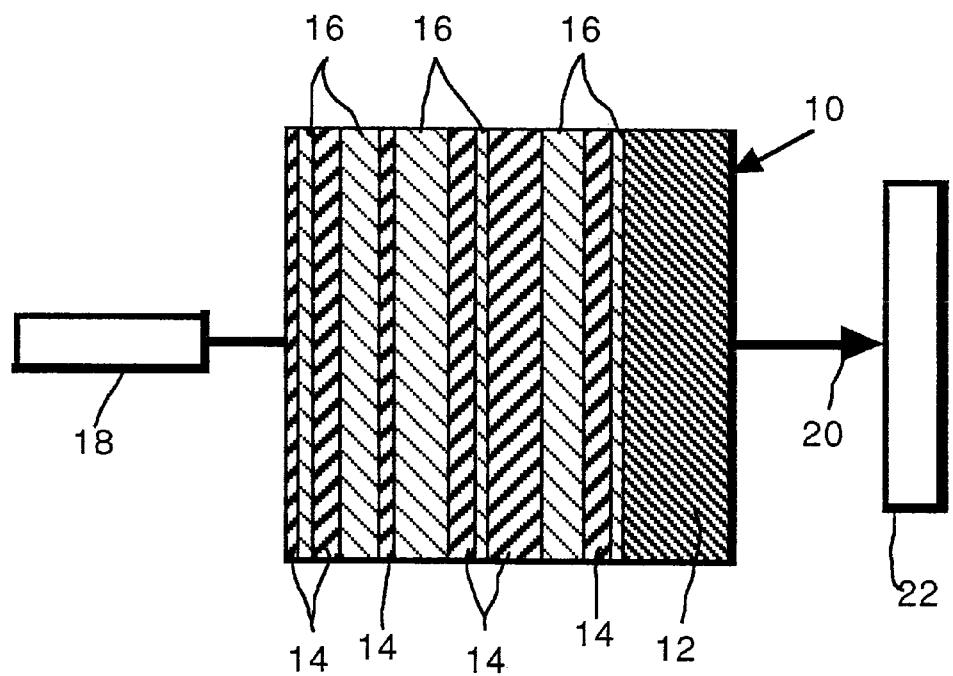
FIG. 2 is an enlarged cross section of the same interference filter illustrating a generalized arrangement of high and low refractive index layers on a common substrate and traversed by a monitoring light beam.

As shown in FIG. 2, the exemplary gain-flattening interference filter 10 is constructed by a series of layers 14 and 16 having different refractive indices supported on a common substrate 12. The substrate 12 can be made from a variety of glasses and other materials including Schott BK7, Schott F7, Schott DWDM-20 or DWDM-22 (Schott Glass Technologies, Duryea, Pa.) Hoya WDM-100 (Hoya Corporation, Lewisville Tex.), and Ohara WMS-13 (Ohara Corporation, Branchburg, N.J.).

The so-called "high" index layers 14 can be made of a transmissive material such as $Ta_2O_5$. The so-called "low" index layers 16 can be made of a transmissive material such as $SiO_2$. Both metal oxides are preferably vacuum deposited onto the substrate 12 using energetic plasma-based techniques, such as ion beam or magnetron sputtering and reactive ion plating, within an evacuated environment. Other metal oxides having appropriate qualities for forming the layers 14 or 16 include $Nb_2O_5$, $TiO_2$, $ZrO_2$, and $Al_2O_3$.

Figure 3:
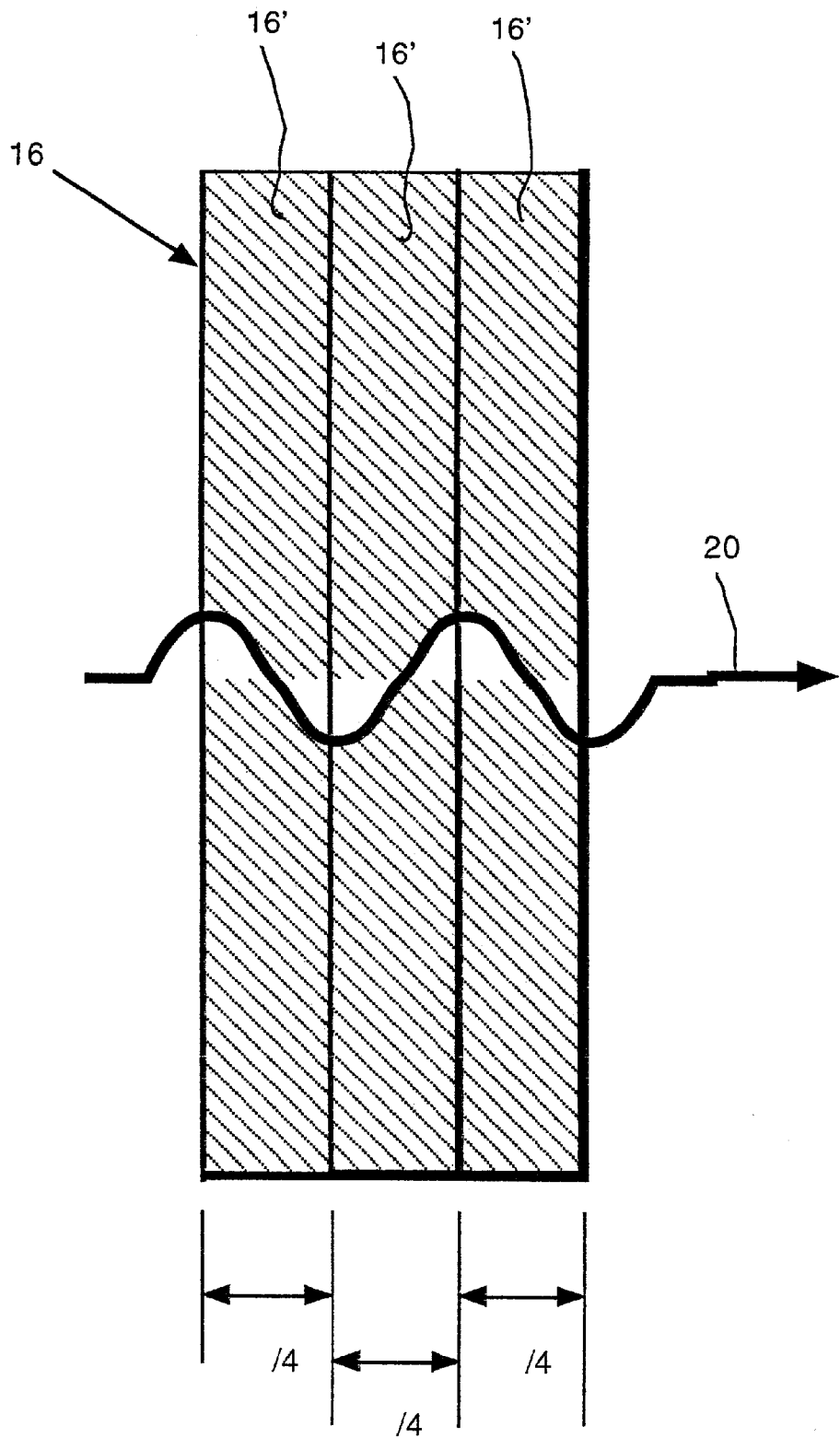
FIG. 3 is a further enlargement of a single layer of our filter showing its construction in unit sub-layers each having a thickness equal to a quarter wavelength travel of the monitoring light beam.

In addition to differing in refractive index, each of the high and low index layers 14 and 16 also differ in physical thickness to support a more complex spectral response. However, the thickness variations are limited to integer multiples of quarter-wavelength travels of a monitoring light beam 20 as transmitted through the layers 14 and 16. FIG. 3 shows an exemplary low index layer 16 composed of three sub-layers 16', each having a thickness equal to a quarter wavelength travel of the monitoring light beam 20 as transmitted through the sub-layers 16'.

The monitoring beam 20 as also seen in FIG. 2 is preferably a narrow-band (i.e., temporally coherent) light beam emitted by a laser 18 and is monitored by a intensity sensor 22 for measuring variations in the transmission efficiency of the filter 10 as the layers 14 and 16 are deposited. Alternatively, a similar intensity sensor 22 could be used for monitoring reflections from the filter 10, which can increase the contrast of the extrema for layers that are insensitive in transmission.

The assembly of our gain-flattening interference filter 10 from sub-layers having unit thicknesses equal to a quarter wavelength travel of the monitoring beam 20 enables our interference filter (a) to exhibit the complex spectral responses required of gain-flattening filters and (b) to be produced by so-called "turning point monitoring" techniques previously limited to less complex spectral responses. The use of "turning point monitoring" techniques provides for producing our gain-flattening interference filter 10 with the higher manufacturing accuracy previously reserved for simpler interference filter designs.

Figure 4:
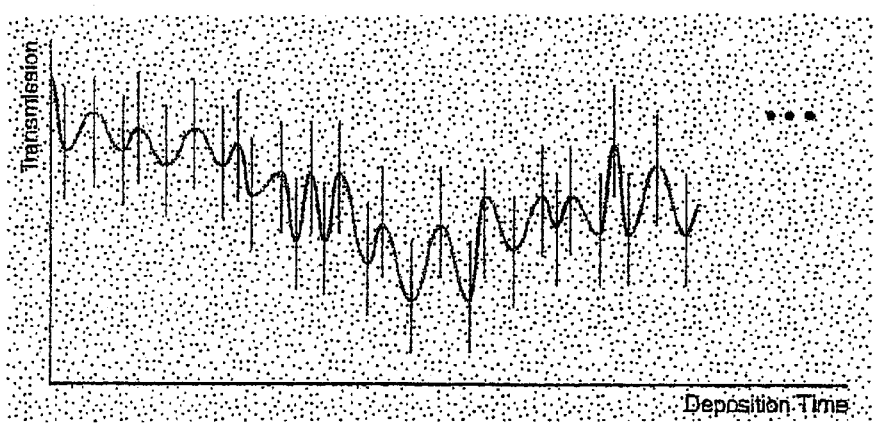
FIG. 4 is a plot of transmission over time relating transitions in the interference effects of the monitoring beam with turning points in the deposition of a succession of unit sub-layers.

A typical transmission versus time plot for the monitoring beam 20 during a vacuum deposition process (e.g., sputtering) of the two different index materials is shown in FIG. 4. An oscillating pattern of transmission variation occurs during the deposition process. Turning points associated with the demarcated troughs and peaks indicate local variations between constructive and destructive interference. For example, the troughs indicate a local extreme of destructive interference, and the peaks indicate a local extreme of constructive interference.

The extremes of constructive and destructive interference occur during the deposition process at layer thicknesses corresponding to a multiple of the quarter wavelength travel of the monitoring beam 20 as transmitted through the layers 14 and 16. The transmission extrema of the monitoring beam 20 are used as turning points for switching deposition from one of the high and low index layers 14 and 16 to the other of the high and low index layers 14 and 16. Each transition from peak to trough or trough to peak represents a quarter-wavelength deposition thickness. The selected turning points can occur after a single transition or after multiple transitions for depositing layers 14 or 16 having thicknesses equal to a multiple of the quarter-wavelength travel of the monitoring beam 20.

The monitoring beam 20 is transmitted through a single spot (as shown) or through multiple spots on the substrate 12, which during deposition can be in the form of a 30 centimeter (cm) diameter disk. Spots about a particular radius of the disk can be averaged to monitor deposition consistency over a larger area of the substrate 12.

Although the thickness variations among the high and low index layers 14 and 16 are limited to multiples of the unit quarter-wavelength travels, we have found that a more generalized pattern of such variations can produce the complex spectral responses required for gain flattening or other similarly complex applications such as color correction. An exemplary desired spectral response for a gain-flattening filter along with a simulated response of our gain-flattening filter 10 are plotted in FIG. 5 in units of decibel (dB) transmission over a working range of wavelengths.

Freedoms available for matching the desired spectral response with our gain-flattening filter include variations in the total number of layers 14 and 16, in the refractive indices of the layers 14 and 16, and in the wavelength of the monitoring beam 20. The number of unit sub-layers is preferably limited to between 80 and 200 sub-layers. The refractive indices are limited by available choices of optical materials that are transmissive within the wavelength range of the different wavelength channels. The monitoring wavelength is also limited by the transmission spectra of the layer materials. However, we have found that preferred wavelengths of the monitoring beam 20 are generally beyond the working range of wavelengths intended for attenuation by the filter 10. Longer wavelengths (e.g., 10 nm to 100 nm larger than the central wavelength of the filter) produce some of the best designs.

Various algorithms can be used for optimizing these starting variables within the bounds of physical practicalities such as substituting procedures that compare proposed designs with a merit function. For example, a design having a given number of layers with thicknesses limited to a multiple of a given monitoring beam's quarter wavelength in the layer materials can be modeled by conventional optical principles to yield a simulated spectral response. A merit function, such as a normalized sum of the squares (at a set of discrete wavelengths) of the differences between the target and simulated responses, can be used to compare the simulated spectral response to the desired spectral response and note the difference. FIG. 6 plots a measured difference between the simulated and desired spectral responses plotted in FIG. 5.

Design comparisons can be made by flipping each layer one at a time from a high index layer 14 to a low index layer 16 or from a low index layer 16 to a high index layer 14 and by maintaining any change that better satisfies the merit function. The iterations can step from one end of the stack of layers 14 and 16 to the other or from some point in the middle of the stack of layers 14 and 16 to both ends and can be repeated (typically five or six times) until the changes do not provide any significant further improvement. The best interim design is stored. A variable such as the number of layers or the monitoring wavelength is then changed, and further iterations are conducted until another best interim design is determined for the new combination of starting variables.

The stored best interim designs are compared with each other, but not necessarily in accordance with the original merit function alone. For example, the best interim designs can be compared based on design stability and manufactureability. Designs that (a) are less sensitive to manufacturing errors, (b) have the fewest number of layers, and (c) use monitoring wavelengths that maximize signal-to-noise ratio are preferred. For example, designs that exhibit the largest second order derivatives at the extrema in the transmission vs. time plot enable turning points to be identified more precisely during the deposition process.

In addition, combinations of layers that produce so-called "insensitive" layers are preferably avoided. Glass substrates, such as the substrate 12, can have refractive indices similar to one of the high and low index layers 14 or 16. If the first layer or any combination of layers equivalent to a first layer has inadequate refractive index contrast with the substrate 12, interference extrema associated with the deposit of the insensitive layer are significantly weakened. Equivalent combinations of layers that are avoided include balanced pairs of high and low index layers, producing all half-wavelength multiples between a layer under deposit (i.e., the equivalent first layer) and the substrate 12. Alternatively, the intensity of the monitoring beam 20 can be measured in reflection from the filter 10 to enhance contrast between the weaker extrema (as a percentage difference of the reflected beam) of otherwise insensitive layers.

Although only two different refractive index layers 14 and 16 are shown, the filter 10 can be composed of layers exhibiting three or more different refractive indices. In addition, the high and low refractive index layers can be mixed within the quarter-wavelength unit sub-layers to provide mid-index sub-layers. The additional refractive index sub-layers further expand options for arriving at a best design.

The processing time for determining the simulated spectral response for each iteration can be significant and limit the number of iterations that can be carried out in an allotted time. Our invention in a preferred embodiment simplifies the determination of individual spectral responses by (a) organizing combinations of the high, low, or other different index sub-layers 14' and 16' into a set of base permutations including alternatives that vary in both number and order of the different index sub-layers 14' and 16', (b) assembling the high, low, or other different index layers 14 and 16 into a plurality of levels, and (c) filling each of the levels with one of the alternatives from the set of base permutations. Time is saved by pre-calculating the contribution of each permutation to the overall spectral response.

FIG. 7 depicts a gain-flattening filter 40 assembled by levels 42a–42e on a common substrate 44. FIG. 8 depicts a set 50 of base permutations labeled H, L, HH, HL, LH, LL, HHH, HHL, HLH, LHH, HLL, LHL, LLH, and LLL for delineating alternative combinations of the high (H) and low (L) index sub-layers 14' and 16' that vary in both number and order. The depicted set 50 of base permutations varies in number of combined sub-levels from one to three and includes every possible order of the sub-layers 14' and 16' within each allotted number of combined sub-levels.

Each of the levels 42a–42e of the filter 40 is filled by one of the alternative permutations H, L, HH, HL, LH, LL, HHH, HHL, HLH, LHH, HLL, LHL, LLH, and LLL from the set 50 of base permutations. For example, the level 42a is filled by the permutation HLH, the level 42b is filled by the permutation LL, the level 42c is filled by the permutation HHL, the level 42d is filled by the permutation L, and the level 42e is filled by the permutation LHH.

The spectral filtering contribution of each of the permutations H, L, HH, HL, LH, LL, HHH, HHL, HLH, LHH, HLL, LHL, LLH, and LLL from the set 50 of base permutations is pre-calculated to reduce processing time. The entire set 50 of base permutations can be substituted one at a time for each level 42a–42e, and the optical performance characteristics of the resulting filter 40 can be compared to the desired filter spectral response (e.g., the determined relative optical power adjustments among the plurality of different wavelength channels) according to a prescribed merit function. The base permutation H, L, HH, HL, LH, LL, HHH, HHL, HLH, LHH, HLL, LHL, LLH, or LLL that best satisfies the merit function among its set of peers in each one of the levels 42a–42e is maintained during a similar round of substitutions for each other of the levels 42a–42e. The levels 42a–42e can be assessed in various orders, and the same or a different order of assessment can be repeated until no further significant improvement is achieved.

Although the exemplary gain-flattening interference filters 10 and 40 are illustrated with just a limited number of layers 14 and 16, tens to hundreds of the layers are generally required for achieving many of the desired complex spectral responses. Further variation in spectral response can be achieved by constructing unit sub-layers from three or more refractive index materials. The third material greatly expands the number of unit sub-layer permutations available for substitution.

Alternatively, the high and low refractive index materials can be combined within the same unit sub-layer to construct a mid-refractive index sub-layer. The concept of the Herpin Equivalent Index can be used to replace a layer of homogeneous material having a particular refractive index with an equivalent structure containing a symmetric arrangement of layers of different materials having two different refractive indices. Although the division of high and low refractive index materials within the same unit sub-layer cannot be regulated by "turning point monitoring" techniques, the technique can be used to regulate the thickness of the mid-index sub-layer itself.

Our thin-film interference filters are preferably constructed with all quarter-wavelength unit sub-layers for achieving most spectral responses. However, one or more non-quarter-wavelength based layers can be added at the end of the deposition process to increase design flexibility or to perform additional functions. For example, non-quarter-wavelength based layers can be added to the end of an otherwise all-quarter wavelength based filter to further refine the filter's spectral response.

Product Example A

An example of our new gain-flattening interference filter arranged for matching the target spectrum of FIG. 5 is constructed with a succession of high (H) and low (L) index unit sub-layers according to the following pattern:

AirLHHHHHHLHLLHHHLHLLHHHLLHH-
HHLHLLHHLLLH HLHHLLHHHHHHHLLL-
HHLLHLLLLLLHHLHHHLHLLHLL
LHLLHLHLLHLHHLHLHLLHLHHHHL-
HHLLLLLLHLHHHH LHHLHLLHHHLLHHH-
HHLHLLLLLHHHHLHLLHLLHHLHH
LHHLLLLLHLLLLHLLHLHHLHH-
HHLLLHSubstrate "Air" refers to the medium above the filter, and "Substrate" refers to the glass substrate upon which the sub-layers are deposited. The high (H) and low (L) index sub-layers listed above have thicknesses equal to a single quarter wavelength of a 1629.5 nanometer (nm) wavelength monitoring beam as transmitted through the sub-layers. The high-index (H) sub-layers are made of $Nb_2O_5$ and have a refractive index of 2.1341 at the monitoring beam wavelength. The low-index (L) sub-layers are made of $SiO_2$ and have a refractive index of 1.4490 at the monitoring beam wavelength. The refractive indices of the deposited layers are sensitive to the energetics of the selected deposition process (e.g., evaporation or ion beam sputtering), which should be considered in matching the simulated designs to actual designs.

The high (H) and low (L) index sub-layers share the same optical thickness (however far the monitoring beam happens to travel through one-quarter wavelength) but differ from each other in physical thickness as an inverse ratio of their refractive indices. The precise thicknesses of the high (H) and low (L) index sub-layers are equal to one-quarter of the monitoring beam wavelength (in a vacuum) divided by the refractive indices of the sub-layers. In other words, the quarter-wavelength thicknesses are based on the somewhat different wavelengths of the monitoring beam while propagating through the high and low index materials. A total of 186 sub-layers are employed at a combined thickness of 43.64 microns ($\mu$m).

From the plot of FIG. 6, the central wavelength of the target spectral response is noted to be around 1550 nanometers (nm) and covers an approximate working range from 1528 nm to 1560 nm. The 1629.5 nm wavelength of the monitoring beam is well beyond and above this range.

Product Example B

Another example of our new gain-flattening interference filter arranged for matching the target spectrum of FIG. 9 is constructed with a succession of high (H) and low (L) index unit sub-layers according to the following pattern:

Substrate/HLHLLLLLLHLLLHHLLHHLHHHLLH
HHHHLHHLLLHLHLHLHHLLHHLHLL-
HHLHLLHHH LHLLLHLLHLHHLLHHLLLLLHH-
HHLHHLLHLLLLH HLLHHLLLLHHHHLHHL-
HHLHHLHLHHHLLLLHHH
LHHLHHHLHLHLHHHHHLHLLHHLH/Air The high (H) and low (L) index sub-layers listed above have thicknesses equal to a single quarter wavelength of a 1584 nanometer (nm) monitoring beam as transmitted through the sub-layers. The substrate, which is made of glass, has a refractive index of 1.579. The high-index (H) sub-layers are made of $Ta_2O_5$ and have a refractive index of 2.0717 at the monitoring beam wavelength. The low-index (L) sub-layers are made of $SiO_2$ and have a refractive index of 1.4748 at the monitoring beam wavelength. A total of 158 sub-layers are employed at a combined thickness of 36.08 microns ($\mu$m).

As best seen from the plot of FIG. 10, the simulated response (designed spectrum) of the exemplary filter closely matches the target response (target spectrum) within a peak-to-peak error function of 0.93 decibels (dB). This match was achieved over a working range between 1528 nm 1566 nm with combinations of high (H) and low (L) index sub layers that do not depart from quarter wavelength optical thickness.

Design Method Example

An example of our new method of designing a thin-film interference filter for gain flattening includes the following steps:

1. Define a target spectral response for making relative optical power adjustments among the plurality of different wavelength channels.
2. Select high and low refractive index materials for forming high and low index sub-layers. The materials should be low-loss (transmissive) materials that significantly differ in refractive index.
3. Select a set of base permutations containing combinations of the high and low index sub-layers that vary in both number and order (e.g., the 14 base permutations of FIG. 8).
4. Select an allowable range of number of levels and monitoring beam wavelength. For example, 30 to 100 layers is a reasonable range for the set of 14 base permutations. A monitoring beam wavelength range between 1560 nm and 1640 nm is typically appropriate for a filter with a central wavelength of 1550 nm.
5. Set up and save transfer matrices for the base permutations describing the fundamental contribution of each permutation to a spectral response of the filter.
6. Choose a starting number of levels and a starting monitoring beam wavelength.
7. Randomly select an initial design with each level (e.g., 30) filled by one of the base permutations (e.g., 14).
8. Within each of the levels, perform a series of substitutions: (a) cycling through each of the base permutations, (b) calculating a new simulated spectral response for each new filter design based on the saved permutation transfer matrices, (c) comparing the simulated response with the target response, and (d) refilling the level with the base permutation that best satisfies a merit function.
9. Step through each of the levels in a similar way a plurality of times progressively refilling the levels with other base permutations until the changes do not appreciably increase satisfaction of the merit function.
10. Store the best filter design for the given number of levels and monitoring beam wavelength.
11. Repeat steps 7 through 10 with a nested iteration varying both the number of levels and the monitoring beam wavelength throughout their allowable ranges.
12. Compare the stored best filter designs with each other according to selection criteria, which include preferences for fewer total number of the high and low index layers, for monitoring wavelengths maximizing signal-to-noise ratio, and for ease of manufacture. Designs containing insensitive layers that exhibit only weak transmission extrema at quarter-wavelength thicknesses are preferably excluded.

In addition to using variations in the number of levels and the monitoring beam wavelength to converge the simulated spectral response toward the target response, variations can be made in the set of base permutations, the refractive indices of the materials, and the number of different materials. If necessary, additional layers having thicknesses not limited to quarter-wavelength integer multiples of a monitoring beam can be appended to the design (as the last layers deposited) to further refine the spectral response of the filter or to perform an additional function. Other algorithms can be used or developed to reduce the dependence on iteration or otherwise reduce processing time. For example, better design starting points based on mathematical evaluations or experience could be used to find more optimum designs.

We claim:

1. A gain-flattening interference filter that adjusts relative power among a plurality of different wavelength channels conveyed through the filter comprising:
    a plurality of layers formed from at least two different refractive index materials;
    each of the layers being composed of an integer multiple number of unit sub-layers having physical thicknesses corresponding to a quarter-wavelength travel of a monitoring light beam as transmitted through the unit sub-layers;
    the at least two different refractive index materials including high and low refractive index materials arranged in the unit sub-layers having physical thicknesses that differ in inverse relation to their refractive indices; and
    the high and low index unit sub-layers being arranged in a substantially non-repeating pattern for producing different attenuating effects among the different wavelength channels conveyed through the filter.

2. The gain-flattening interference filter of claim 1 in which a wavelength of the monitoring light beam from which the quarter-wavelength travel is derived differs from a central wavelength of the different wavelength channels attenuated by the filter.

3. The gain-flattening interference filter of claim 2 in which the wavelength of the monitoring light beam is beyond a working range of wavelengths spanned by the different wavelength channels attenuated by the filter.

4. The gain-flattening interference filter of claim 3 in which the wavelength of the monitoring light beam is longer than the working range of wavelengths spanned by the different wavelength channels.

5. The gain-flattening interference filter of claim 1 in which the plurality of layers is assembled in levels, and each of the levels is filled by one permutation among a set of the high and low index unit sub-layers.

6. The gain-flattening interference filter of claim 5 in which the set of high and low index unit sub-layers contains permutations that vary in both number and order of the high and low index unit sub-layers.

7. The gain-flattening interference filter of claim 6 in which adjacent levels differ in both the number and the order of the high and low index sub-layers filling the adjacent levels.

8. The gain-flattening interference filter of claim 1 in which the at least two different refractive index materials are combined in a mid-index layer having a physical thickness corresponding to an integer multiple of a quarter-wavelength travel of a monitoring light beam as transmitted through the mid-index layer, and the mid-index layer is combined with the high and low index unit sub-layers in a substantially non-repeating pattern for producing different attenuating effects among the different wavelength channels conveyed through the filter.

9. The gain-flattening interference filter of claim 1 further comprising one or more additional layers formed from one or more of the at least two different refractive index materials, and the one or more additional layers depart in physical thickness from an integer multiple of a quarter-wavelength travel of a monitoring light beam as transmitted through the one or more additional layers.

10. The gain-flattening interference filter of claim 9 in which the one or more additional layers do not interrupt the substantially non-repeating pattern of the high and low index unit sub-layers.

11. A method of making a gain-flattening interference filter for relatively adjusting optical power among a plurality of different wavelength channels conveyed through the filter comprising steps of:
    determining relative optical power adjustments among the plurality of different wavelength channels;
    choosing at least two different refractive index materials capable of being separately deposited as high and low refractive index layers;
    choosing a wavelength of a monitoring light beam;
    depositing the high and low refractive index layers as integer multiples of unit sub-layers having physical thicknesses corresponding to quarter-wavelength travels of the monitoring light beam as transmitted through the sub-layers; and
    arranging the unit sub-layers of the high and low refractive index layers in a substantially non-repeating pattern for producing different attenuating effects among the different wavelength channels conveyed through the filter.

12. The method of claim 11 in which the step of depositing includes (a) transmitting the monitoring beam through the high and low index layers and (b) measuring transmission characteristics of the monitoring beam to identify transitions associated with a deposition thickness corresponding to integer multiples of quarter-wavelength travels of the monitoring beam.

13. The method of claim 11 in which the step of choosing a wavelength includes choosing a wavelength for the monitoring beam that differs from a central wavelength of the different wavelength channels attenuated by the filter.

14. The method of claim 13 in which the step of choosing a wavelength includes choosing a wavelength for the monitoring beam that is beyond a working range of wavelengths spanned by the different wavelength channels attenuated by the filter.

15. The method of claim 14 in which the step of choosing a wavelength includes choosing a wavelength for the monitoring beam that is longer than the working range of wavelengths spanned by the different wavelength channels.

16. The method of claim 11 including further steps of assembling the high and low index layers into levels, arranging combinations of the high and low index unit sub-layers into a set of permutations, and choosing one among the set of permutations to fill each level.

17. The method of claim 16 in which the permutations include alternatives that vary in both number and order of the high and low index unit sub-layers.

18. The method of claim 17 including a further step of determining optical performance characteristics of the alternative index layer permutations.

19. The method of claim 18 including a further step of evaluating optical performance characteristics of a plurality of the levels containing different unit sub-layer permutations.

20. The method of claim 19 including a further step of comparing the optical performance characteristics of the plurality of levels each filled by one of the chosen index sub-layer permutations to the determined relative optical power adjustments among the plurality of different wavelength channels.

21. The method of claim 20 including further steps of replacing one of the set of permutations that fills one of the levels with another of the set of permutations, evaluating revised optical performance characteristics of the plurality of levels including the level filled by the replacement permutation, and comparing the revised optical performance characteristics to determined relative optical power adjustments among the plurality of different wavelength channels.

22. The method of claim 11 in which the step of depositing includes depositing the unit sub-layers in succession on a common substrate, transmitting the monitoring light beam through the succession of unit sub-layers, and measuring variations in the transmission of the monitoring light beam produced by interference effects of the unit sub-layers.

23. The method of claim 22 in which the step of depositing includes vacuum depositing the two different refractive index materials in an evacuated environment.

24. The method of claim 22 in which the step of arranging includes identifying paired combinations of both the high and low refractive index sub-layers that render a succeeding sub-layer insensitive to interference effects of the monitoring beam and excluding such combinations from the pattern of sub-layers filling levels between the succeeding sub-layer and the substrate.

25. The method of claim 22 in which the step of choosing at least two different refractive index materials includes choosing a third refractive index material capable of being separately deposited as a mid-refractive index layer, and the step of depositing the high and low refractive index layers includes depositing the mid-refractive index layer as an integer multiple of a unit sub-layer having a physical thickness corresponding to quarter-wavelength travels of the monitoring light beam as transmitted through the mid-refractive index sub-layers.

26. The method of claim 22 in which the step of depositing includes depositing a combination of the high and low refractive index materials as a mid-refractive index unit sub-layer that can be arranged together with the unit sub-layers of the high and low refractive index layers in the substantially non-repeating pattern for producing different attenuating effects among the different wavelength channels conveyed through the filter.

27. The method of claim 11 in which the step of depositing includes appending one or more of the high and low refractive index layers having physical thicknesses that depart from integer multiples of quarter-wavelength travels of the monitoring light beam as transmitted through the one or more appended layers.

28. The method of claim 27 in which the one or more appended layers are deposited after the deposit of the integer multiple unit sub-layers in the substantially non-repeating pattern.

29. A method of designing a gain-flattening interference filter for adjusting optical power among a plurality of different wavelength channels comprising steps of:
  determining relative optical power adjustments among the plurality of different wavelength channels;
  choosing at least two different refractive index materials capable of functioning as high and low refractive index layers;
  dividing the high and low refractive index layers into high and low index sub-layers having unit thicknesses;
  organizing combinations of the high and low index sub-layers into a set of base permutations including alternatives that vary in both number and order of the high and low index sub-layers;
  assembling the high and low index layers into a number of levels;
  filling each of the levels with one of the alternatives from the set of base permutations;
  evaluating optical performance characteristics of the levels filled by alternatives from the set of base permutations;
  comparing the optical performance characteristics of the filled levels to the determined relative optical power adjustments among the plurality of different wavelength channels; and
  refilling the levels with different alternatives from the set of base permutations based on the results of the comparison for better matching the optical performance characteristics of the selected number of levels with the determined optical power adjustments among the plurality of different wavelength channels.

30. The method of claim 29 including the further step of pre-evaluating performance characteristics of the alternatives from the set of base permutations for simplifying the evaluation of optical performance characteristics of the filled levels.

31. The method of claim 29 in which the step of dividing includes dividing the high and low refractive index layers into high and low index sub-layers having unit thicknesses equal to a quarter-wavelength travel of a monitoring light beam as transmitted through the sub-layers.

32. The method of claim 31 including further steps of varying a wavelength of the monitoring light beam along with the corresponding quarter-wavelength thicknesses of the sub-layers and repeating the step of comparing the performance characteristics to better match the determined optical power adjustments among the plurality of different wavelength channels.

33. The method of claim 31 in which the step of evaluating includes identifying paired combinations of both the high and low refractive index layers that render a succeeding layer insensitive to interference effects of the monitoring beam and excluding such combinations from the permutations filling levels between the succeeding layer and a substrate.

34. The method of claim 31 in which the steps of comparing and refilling are repeated in an iterative manner to converge the optical performance characteristics of the selected number of levels towards the determined optical power adjustments among the plurality of different wavelength channels.

35. The method of claim 34 including a further step of storing filter designs corresponding to particular iterations of the filled levels meeting criteria for matching the determined optical power adjustments among the plurality of different wavelength channels.

36. The method of claim 35 including a further step of choosing among the stored filter designs based on a further set of criteria.

37. The method of claim 36 in which the further set of criteria includes preferences for fewer total number of the high and low index layers, for monitoring wavelengths maximizing signal-to-noise ratio, and for ease of manufacture.

38. An interference filter assembled from a succession of layers having variable thicknesses regulatable by a turning point monitoring technique for variably attenuating a working range of wavelengths comprising:
  the succession of variable-thickness layers being formed from at least two different refractive index materials;
  each of the variable-thickness layers within an uninterrupted portion of the succession being composed of an integer multiple number of unit sub-layers having physical thicknesses corresponding to a quarter-wavelength travel of a monitoring light beam as transmitted through the unit sub-layers;

some of the unit sub-layers of quarter-wavelength thickness being formed from one of the refractive index materials and other of the unit sub-layers of quarter-wavelength thickness being formed from other of the refractive index materials;

the different index unit sub-layers being arranged in a substantially non-repeating pattern; and the monitoring light beam wavelength from which the quarter-wavelength travel is derived being longer than the working range of wavelengths attenuated by the interference filter.

39. The interference filter of claim 38 in which the monitoring beam wavelength is between 10 nanometers and 100 nanometers longer than a central wavelength attenuated by the filter.

40. The interference filter of claim 38 in which:
(a) the at least two different refractive index materials include high and low refractive index materials;
(b) the different index unit sub-layers include high and low index unit sub-layers separately composed of the high and low index materials;
(c) the high index unit sub-layers vary in number for forming high index layers of varying thickness;
(d) the low index unit sub-layers vary in number for forming low index layers of varying thickness; and
(e) the number of high and low index sub-layers forming the high and low index layers vary from layer to layer throughout the substantially non-repeating pattern.

41. The interference filter of claim 40 in which the high and low refractive index materials are combined in a mid-index layer having a physical thickness corresponding to an integer multiple of a quarter-wavelength travel of a monitoring light beam as transmitted through the mid-index layer, and the mid-index layer is combined with the high and low index layers within the uninterrupted portion of the succession of variable thickness layers.

42. The interference filter of claim 41 in which the mid-index layer varies in thickness throughout the uninterrupted portion of the succession of variable thickness layers.

43. The interference filter of claim 40 in which different refractive index materials include a mid-index material that forms mid-index layers having a physical thickness corresponding to an integer multiple of a quarter-wavelength travel of a monitoring light beam as transmitted through the mid-index layer, and the mid-index layer is combined with the high and low index layers within the uninterrupted portion of the succession of variable thickness layers.

44. The interference filter of claim 43 in which the mid-index layer varies in thickness throughout the uninterrupted portion of the succession of variable thickness layers an integer multiple of a quarter-wavelength travel of a monitoring light beam as transmitted through the mid-index layer.

45. The interference filter of claim 38 further comprising one or more additional layers formed from one or more of the at least two different refractive index materials, and the one or more additional layers depart in physical thickness from an integer multiple of a quarter-wavelength travel of a monitoring light beam as transmitted through the one or more additional layers.

46. The interference filter of claim 45 in which the one or more additional layers form a portion of the succession of variable-thickness layers beyond the uninterrupted portion of the succession.

* * * * *